United States Patent
Allain et al.

(10) Patent No.: US 11,459,123 B2
(45) Date of Patent: Oct. 4, 2022

(54) METHOD FOR ASSEMBLING AT LEAST TWO PARTS BY TRANSPARENT WELDING, METHOD FOR ASSEMBLING A PRIMARY STRUCTURE OF AN AIRCRAFT PYLON BY TRANSPARENT WELDING, PRIMARY STRUCTURE OF AN AIRCRAFT PYLON THUS OBTAINED AND AIRCRAFT COMPRISING SAID PRIMARY STRUCTURE

(71) Applicant: Airbus Operations S.A.S., Toulouse (FR)

(72) Inventors: Julien Allain, Toulouse (FR); Stephane Pernodet, Toulouse (FR)

(73) Assignee: Airbus Operations S.A.S.

( * ) Notice: Subject to any disclaimer, the term of this patent is extended or adjusted under 35 U.S.C. 154(b) by 497 days.

(21) Appl. No.: 16/688,251

(22) Filed: Nov. 19, 2019

(65) Prior Publication Data
US 2020/0180785 A1   Jun. 11, 2020

(30) Foreign Application Priority Data

Dec. 5, 2018 (FR) ..................................... 18 72396

(51) Int. Cl.
*B64F 5/10* (2017.01)
*B23K 15/00* (2006.01)
*B64D 29/02* (2006.01)

(52) U.S. Cl.
CPC ............ *B64F 5/10* (2017.01); *B23K 15/0053* (2013.01); *B64D 29/02* (2013.01)

(58) Field of Classification Search
CPC ........ B64F 5/10; B23K 15/0053; B64D 29/06

USPC .......................................................... 244/54
See application file for complete search history.

(56) References Cited

U.S. PATENT DOCUMENTS

| 3,437,785 | A | | 4/1969 | Sciaky | |
|---|---|---|---|---|---|
| 3,663,794 | A | * | 5/1972 | de Cachard | B23K 15/0053 219/121.28 |
| 6,779,707 | B2 | * | 8/2004 | Dracup | B23K 20/1265 244/119 |
| 8,356,772 | B2 | * | 1/2013 | Bense | B64C 1/069 244/119 |
| 8,398,024 | B2 | * | 3/2013 | Tucker | B64C 3/18 244/123.1 |

(Continued)

FOREIGN PATENT DOCUMENTS

| CN | 103658967 A | * | 3/2014 | ............ B23K 20/122 |
|---|---|---|---|---|
| CN | 107618653 A | * | 1/2018 | ......... B23K 20/1265 |

(Continued)

*Primary Examiner* — Christopher P Ellis
(74) *Attorney, Agent, or Firm* — Lerner, David, Littenberg, Krumholz & Mentlik, LLP

(57) ABSTRACT

A method for assembling at least two parts includes using transparent welding using an energy input beam which travels a trajectory in a closed loop. The trajectory of the energy input beam and/or at least one parameter of the energy input beam is configured so that the weld bead has mechanical and/or geometrical characteristics that are substantially constant over all its length. A method for assembling a primary structure of an aircraft pylon which uses this assembly method to link the panels of the primary structure to one another, a primary structure of an aircraft pylon thus obtained, as well as an aircraft comprising at least one such primary structure is also described.

11 Claims, 4 Drawing Sheets

(56) References Cited

U.S. PATENT DOCUMENTS

| | | | | |
|---|---|---|---|---|
| 9,845,728 | B2* | 12/2017 | Brown | B23K 20/12 |
| 10,843,293 | B2* | 11/2020 | Hisada | B23K 26/60 |
| 11,011,503 | B2* | 5/2021 | Wang | H01L 23/5385 |
| 2004/0140668 | A1 | 7/2004 | Monsheimer et al. | |
| 2005/0139640 | A1* | 6/2005 | Kay | B23K 20/1265 |
| | | | | 428/615 |
| 2007/0044406 | A1* | 3/2007 | Van Aken | B23K 20/1225 |
| | | | | 52/459 |
| 2010/0047587 | A1* | 2/2010 | Itoh | B29C 66/43 |
| | | | | 428/411.1 |
| 2010/0304151 | A1* | 12/2010 | Tuennermann | C04B 37/042 |
| | | | | 428/428 |
| 2011/0113828 | A1* | 5/2011 | Matsumoto | C03C 23/0025 |
| | | | | 65/33.2 |
| 2011/0121132 | A1 | 5/2011 | Crook et al. | |
| 2011/0268494 | A1* | 11/2011 | Pacchione | B23K 20/1265 |
| | | | | 228/159 |
| 2013/0206817 | A1* | 8/2013 | Tavares | B23K 20/1255 |
| | | | | 228/2.1 |
| 2013/0256457 | A1* | 10/2013 | Goehlich | B64C 1/068 |
| | | | | 29/428 |
| 2013/0344302 | A1 | 12/2013 | Helie et al. | |
| 2014/0069984 | A1* | 3/2014 | Mialhe | B23K 20/122 |
| | | | | 228/2.1 |
| 2015/0192101 | A1* | 7/2015 | Rossi | B23K 15/0006 |
| | | | | 219/121.14 |
| 2017/0008634 | A1* | 1/2017 | Lacko | B64D 29/06 |
| 2018/0050419 | A1* | 2/2018 | Das | B23K 20/126 |
| 2019/0283170 | A1* | 9/2019 | Kuntz | B29C 66/836 |
| 2020/0023461 | A1* | 1/2020 | Galbraith | B23K 26/064 |
| 2020/0238439 | A1* | 7/2020 | Her | B23K 20/122 |
| 2021/0053668 | A1* | 2/2021 | Gruner | B64F 5/10 |
| 2021/0269167 | A1* | 9/2021 | Colmagro | B64D 27/26 |

FOREIGN PATENT DOCUMENTS

| | | | | |
|---|---|---|---|---|
| DE | 102016215406 | A1 | 2/2018 | |
| DE | 102019111226 | A1 * | 11/2020 | |
| EP | 1403030 | A1 | 3/2004 | |
| EP | 3851239 | A1 * | 7/2021 | B23K 20/1225 |
| FR | 2943317 | A1 * | 9/2010 | B23K 20/122 |
| FR | 3022501 | A1 | 12/2015 | |
| GB | 2593272 | A * | 9/2021 | B23K 20/1225 |
| JP | 2017094382 | A * | 6/2017 | |
| KR | 20150039080 | A * | 9/2014 | |
| WO | 2004/004958 | A2 | 1/2004 | |

* cited by examiner

Fig. 1
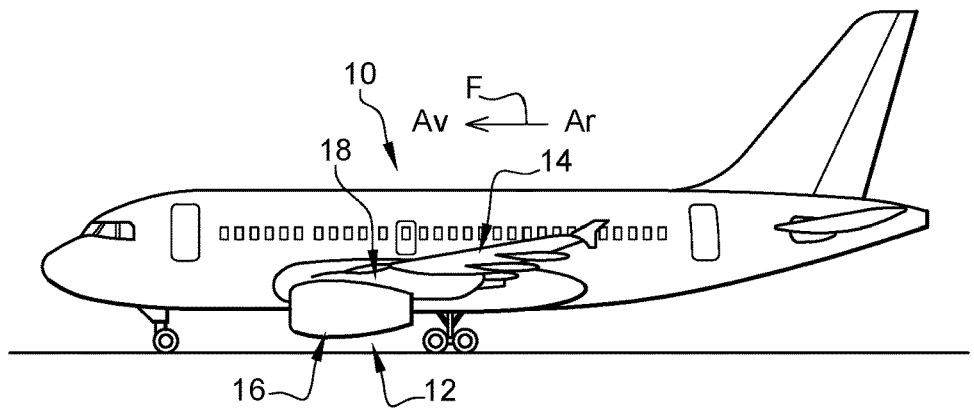
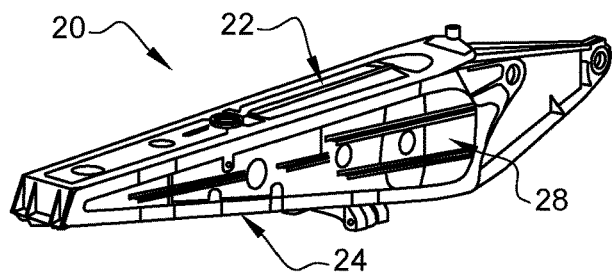
Fig. 2
(PRIOR ART)
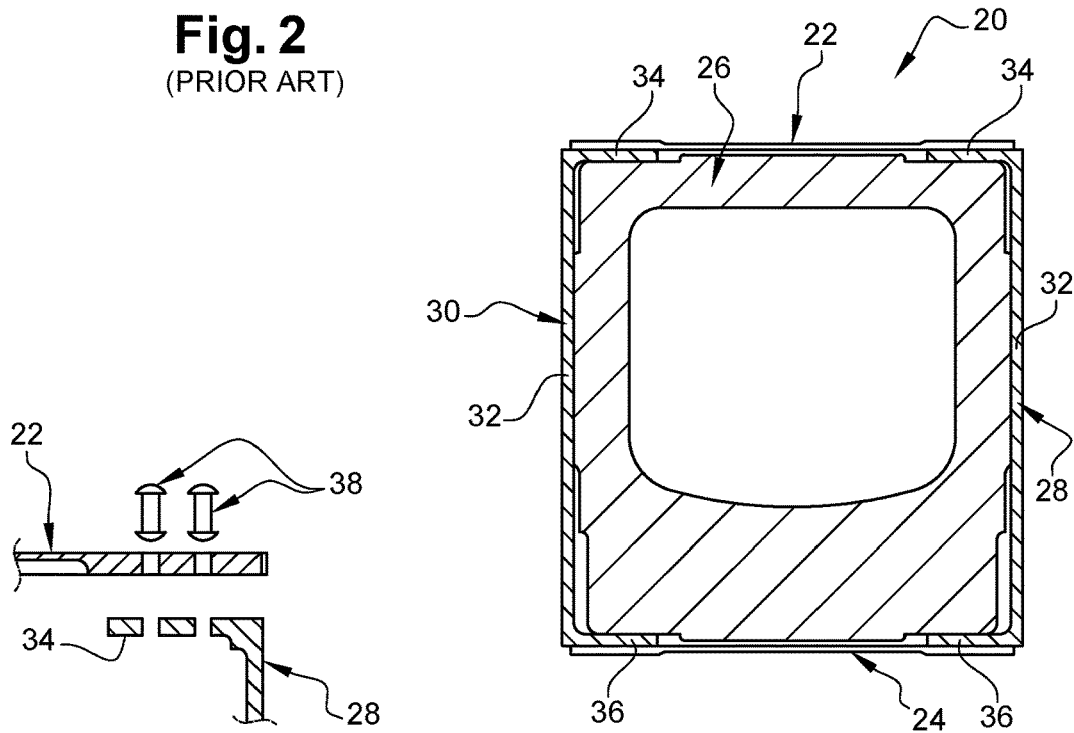
Fig. 4
(PRIOR ART)
Fig. 3
(PRIOR ART)

METHOD FOR ASSEMBLING AT LEAST TWO PARTS BY TRANSPARENT WELDING, METHOD FOR ASSEMBLING A PRIMARY STRUCTURE OF AN AIRCRAFT PYLON BY TRANSPARENT WELDING, PRIMARY STRUCTURE OF AN AIRCRAFT PYLON THUS OBTAINED AND AIRCRAFT COMPRISING SAID PRIMARY STRUCTURE

FIELD OF THE INVENTION

The present invention relates to a method for assembling at least two parts by transparent welding, to a method for assembling a primary structure of an aircraft pylon by transparent welding, to a primary structure of an aircraft pylon thus obtained and to an aircraft comprising said primary structure.

BACKGROUND OF THE INVENTION

According to a configuration that can be seen in FIG. 1, an aircraft 10 comprises several propulsions assemblies 12 which are positioned under the air foil 14 of the aircraft 10. A propulsion assembly 12 comprises a nacelle 16, an engine positioned inside the nacelle 16 and a pylon 18 which ensures the link between the engine and the air foil 14. The pylon 18 comprises a primary structure 20 which ensures, among other things, the transmission of the forces between the engine and the air foil 14.

According to a configuration that can be seen in FIGS. 2 to 4, the primary structure 20 comprises a top spar 22, a bottom spar 24, transverse frames 26 which link the top and bottom spars 22, 24 and which are disposed in transverse planes, as well as two side panels 28, 30 disposed on either side of the transverse frames 26.

According to a first configuration, each side panel 28, 30 comprises a body 32, a top flange 34 which forms an angle with the body 32 as well as a bottom flange 36 which forms an angle with the body 32, the body 32, the top flange 34 and the bottom flange 36 being produced in a single piece.

According to a mode of assembly that can be seen in FIG. 4, each top or bottom flange 34, 36 is linked to a top or bottom spar 22, 24 by a plurality of through link elements 38, such as, for example, screws or rivets.

According to a second configuration, each top or bottom flange 34, 36 is replaced by an angle iron linking the top and bottom spars 22, 24 and the side panels 28, 30 pairwise. Each angle iron is linked to a top or bottom spar 22, 24 and to a side panel 28, 30 by a plurality of through link elements 38, such as, for example, screws or rivets.

The mode of assembly by screwing or riveting requires the presence of top and bottom flanges 34, 36 or of angle irons, which tends to increase the weight of the primary structure 20.

BRIEF SUMMARY OF THE INVENTION

Aspects of the present invention may wholly or partly remedy the drawbacks of the prior art.

A subject of the invention is a method for assembling at least two parts by transparent welding using an energy input beam which travels a trajectory so as to generate a weld bead, disposed straddling the two parts and linking them.

According to an aspect of the invention, the trajectory follows a closed loop, the trajectory of the energy input beam and/or at least one parameter of the energy input beam being configured so that the weld bead has mechanical and/or geometrical characteristics that are substantially constant over all its length.

This solution makes it possible to avoid overdimensioning the parts linked by the weld bead and machining them after the welding step in order to eliminate the irregular ends of the weld bead, which correspond to the starting and stopping portions of the energy input beam, and to retain only the sections of the parts having a regular weld bead.

When this assembly technique is applied to a primary structure of an aircraft pylon, it makes it possible to reduce its weight, top and bottom flanges or angle irons no longer being necessary to link the panels of the primary structure to one another.

According to another feature, the trajectory comprises at least one overlap portion, travelled at least twice by the energy input beam, the overlap portion having a length greater than or equal to the sum of the lengths of the starting and stopping portions of the energy input beam.

According to another feature, the trajectory follows an oblong closed loop, the weld bead having two rectilinear sections that are approximately parallel with little spacing between them and two curved sections linking the rectilinear sections.

According to another feature, each curved section having a start and an end, the energy input beam has an intensity or a power which decreases from the start to the end of each curved section of the trajectory.

According to another feature, the energy input beam has, in each rectilinear section, an intensity or a power having a maximum value, the maximum values in the different rectilinear sections decreasing from one rectilinear section to the other along the trajectory of the energy input beam.

According to a first operating procedure, each rectilinear section having a start and an end, the energy input beam has an intensity or a power which increases from the start to the end of each rectilinear section except for the stopping portion of the energy input beam.

According to a second operating procedure, the energy input beam has an intensity or a power which is substantially constant over each of the rectilinear sections, except for the starting and stopping portions of the energy input beam.

Also a subject of the invention is a method for assembling a primary structure of an aircraft pylon comprising a top panel, a bottom panel, a right side panel and a left side panel, characterized in that at least one top or bottom panel is linked to at least one right or left side panel by using the assembly method according to one of the preceding features.

According to one configuration, each top and bottom panel is linked to each right and left side panel by using the assembly method according to one of the preceding features.

Also subjects of the invention are a primary structure of an aircraft pylon obtained from the assembly method according to the invention as well as an aircraft comprising at least one primary structure of an aircraft pylon thus obtained.

BRIEF DESCRIPTION OF THE DRAWINGS

Other features and advantages will emerge from the following description of the invention, the description being given purely by way of example, in light of the attached drawings in which:

FIG. 1 is a side view of an aircraft,

FIG. 2 is a perspective view of a primary structure of an aircraft pylon which illustrates an embodiment of the prior art, FIG. 3 is a transverse cross section of a primary structure of an aircraft pylon which illustrates an embodiment of the prior art, FIG. 4 is a transverse cross section of a corner of a primary structure of an aircraft pylon which illustrates a mode of assembly of the prior art.

DETAILED DESCRIPTION

Figure 5:
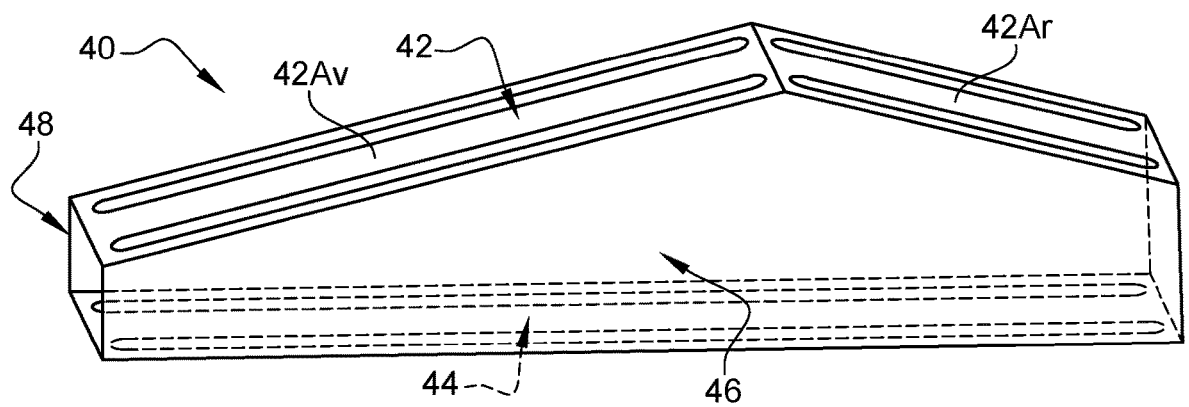
FIG. 5 is a perspective view of a primary structure of an aircraft pylon which illustrates an embodiment of the invention.
Figure 6:
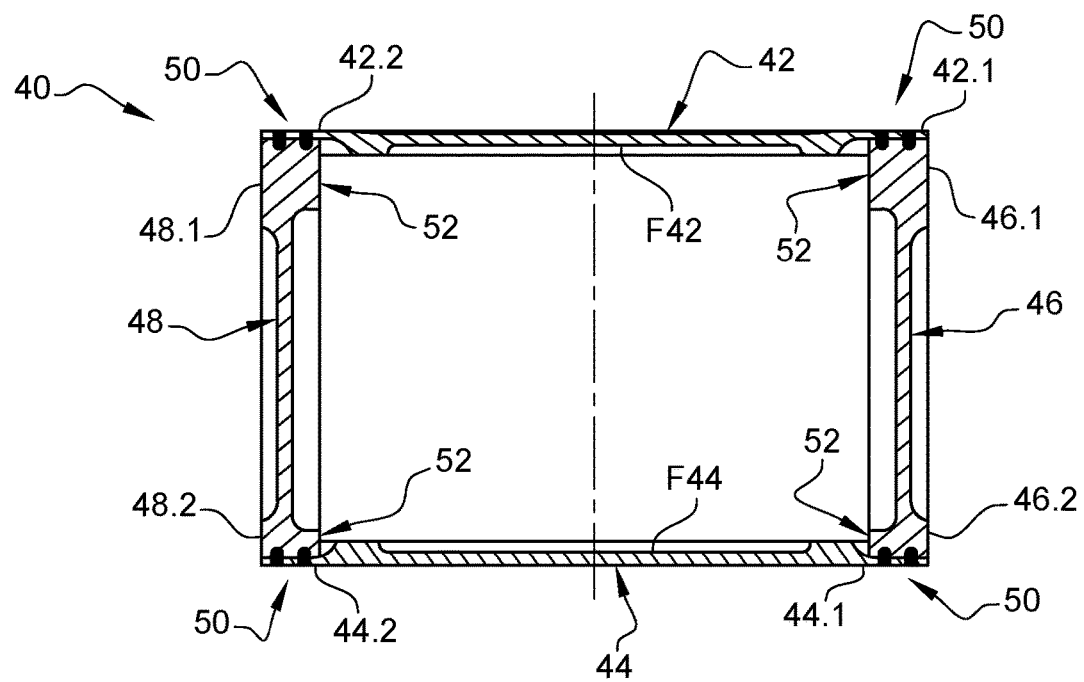
FIG. 6 is a transverse cross section of a primary structure of an aircraft pylon which illustrates an embodiment of the invention.

In FIGS. 5 and 6, a primary structure 40 of an aircraft pylon is represented which comprises:
- a top panel 42, also called top spar, which has a right longitudinal edge 42.1 and a left longitudinal edge 42.2,
- a bottom panel 44, also called bottom spar, which has a right longitudinal edge 44.1 and a left longitudinal edge 44.2,
- a right side panel 46 which has a top longitudinal edge 46.1 linked to the right longitudinal edge 42.1 of the top panel 42 and a bottom longitudinal edge 46.2 linked to the right longitudinal edge 44.1 of the bottom panel 44, and
- a left side panel 48 which has a top longitudinal edge 48.1 linked to the left longitudinal edge 42.2 of the top panel 42 and a bottom longitudinal edge 48.2 linked to the left longitudinal edge 44.2 of the bottom panel 44.

For the rest of the description, a longitudinal direction is parallel to the direction of the engine axis when the pylon is mounted. The terms "front" or "Av" and "rear" or "Ar" refer to a direction of advance of the aircraft 10 following the thrust exerted by the propulsion assemblies 12, this direction being represented by the arrow F in FIG. 1.

The term "right" and "left" refer to the right and left sides of an operator placed in front of the engine and looking in the longitudinal direction towards the rear of the engine. The terms "top" and "bottom" refer to the vertical direction when the pylon is mounted and the aircraft is on the ground.

The primary structure 40 can comprise other elements which are not described and represented, for the purpose of simplification.

According to one configuration, at least one of the panels 42, 44, 46, 48, such as the top panel 42 for example, is produced in two, front and rear parts 42Av and 42Ar which are each linked to the right and left side panels 46, 48.

Each top and bottom panel 42, 44 has a face F42, F44 oriented towards the right and left side panels 46, 48. Each right or left side panel 46, 48 has, on each of its top and bottom longitudinal edges 46.1, 46.2, 48.1, 48.2, a rim configured to be pressed against one of the faces F42, F44 of the top and bottom panels 42, 44.

The primary structure 40 comprises at least one transparent weld 50 linking at least one of the top and bottom panels 42, 44 as well as at least one of the right and left side panels 46, 48. According to one configuration, the primary structure 40 comprises several transparent welds 50 linking each top or bottom panel 42, 44 and each right or left side panel 46, 48.

Each right or left side panel 46, 48 has, on each of its top and bottom longitudinal edges 46.1, 46.2, 48.1, 48.2, an overthickness 52 to accommodate the transparent weld 50.

Figure 7A:
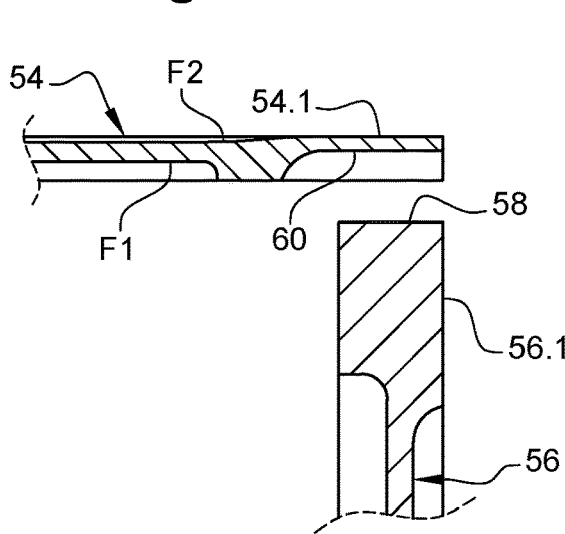
FIG. 7A is a transverse cross section of a corner of a primary structure of an aircraft pylon which illustrates an embodiment of the invention before assembly.
Figure 7B:
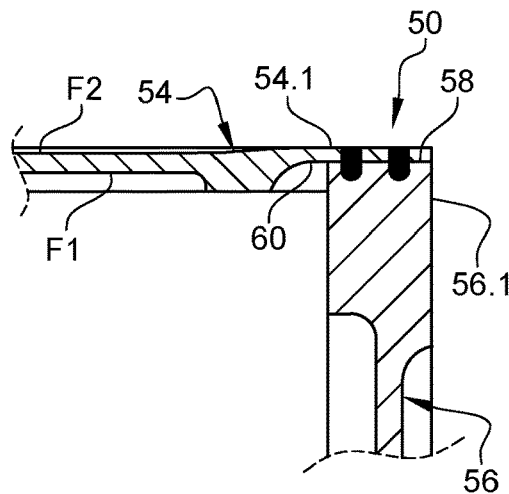
FIG. 7B is a transverse cross section of the corner of the primary structure that can be seen in FIG. 7A after assembly.

In FIGS. 7A and 7B, an assembly is represented comprising a first panel 54 which can be one of the top, bottom, right side or left side panels 42, 44, 46, 48, a second panel 56 which can be one of the top, bottom, right side or left side panels 42, 44, 46, 48 and at least one weld 50 linking the first and second panels 54 and 56.

The first panel 54 comprises a longitudinal edge 54.1 which can be one of the right, left, top or bottom longitudinal edges 42.1, 42.2, 44.1, 44.2, 46.1, 46.2, 48.1, 48.2 of the top, bottom, right side or left side panels 42, 44, 46, 48 of a primary structure 40 of an aircraft pylon. The first panel 54 has a first face F1, oriented towards the second panel 56, and a second face F2 opposite the first face F1.

The second panel 56 comprises a longitudinal edge 56.1 which can be one of the right, left, top or bottom longitudinal edges 42.1, 42.2, 44.1, 44.2, 46.1, 46.2, 48.1, 48.2 of the top, bottom, right side or left side panels 42, 44, 46, 48 of a primary structure 40 of an aircraft pylon, said longitudinal edge 56.1 having a rim 58 configured to bear against the first panel 54. In addition, the first face F1 of the first panel 54 comprises a contact surface 60 against which the rim 58 of the second panel 56 is pressed when the first and second panels 54, 56 are assembled.

According to an aspect of the invention, the weld 50 is a transparent weld produced from the second face F2 of the first panel 54. A transparent weld is more particularly suitable for assembling two panels of a box-formed structure, like the primary structure of an aircraft pylon, the interior of which is difficult to access.

This transparent weld 50 is, as illustrated in FIG. 7B, non-emergent.

Figure 8:
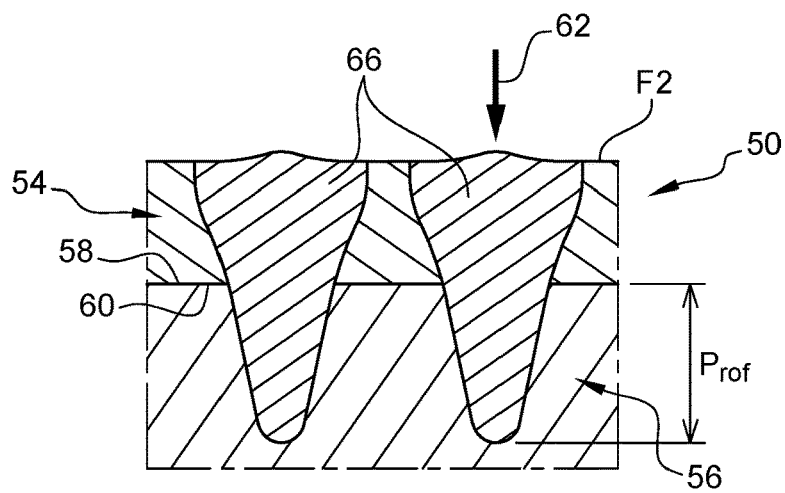
FIG. 8 is a transverse cross section of an assembly by transparent welding which illustrates an embodiment of the invention.

This weld 50 is produced using an energy input beam 62, represented schematically in the form of an arrow in FIG. 8, configured to be displaced along a trajectory 64 so as to obtain a weld bead 66 disposed straddling the first and second panels 54, 56. As illustrated in FIGS. 7B and 8, the weld bead 66 passes through the first panel 54 and extends from the second face F2 to the contact face 60. The weld bead 66 extends from the rim 58 to a certain depth Prof in the second panel 56.

According to one embodiment, the energy input beam 62 is an electron beam. Obviously, the invention is not limited to this embodiment. Thus, the energy input beam could be a laser beam or the like.

When the energy input beam 62 impacts the second face F2 of the first panel 54, it generates a local evaporation of the material and the formation of a cavity in which the weld bead 66 is formed.

The weld bead 66 can be obtained without metal filling or with a metal filling.

Figure 9A:
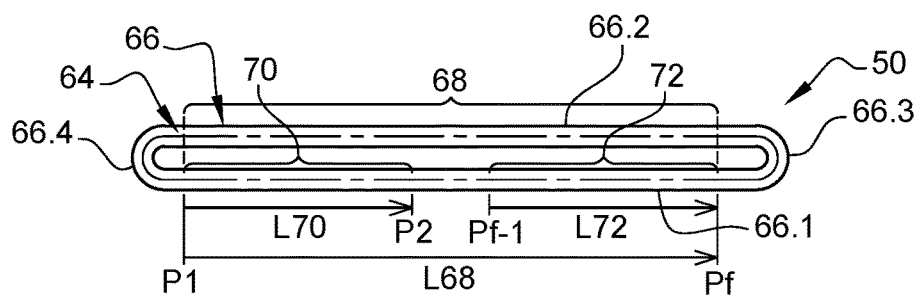
FIG. 9A is a plan view of a transparent weld which illustrates an embodiment of the invention.
Figure 10A:
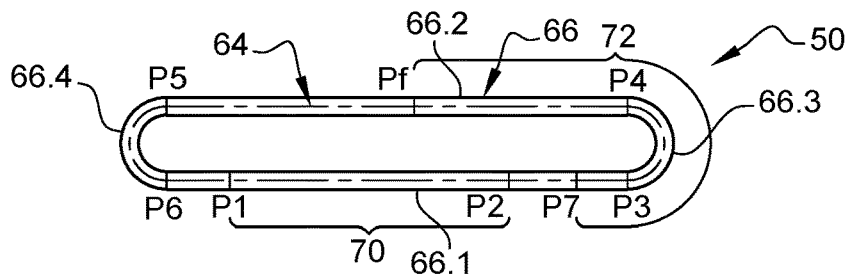
FIG. 10A is a plan view of a transparent weld which illustrates another embodiment of the invention.
Figure 11A:
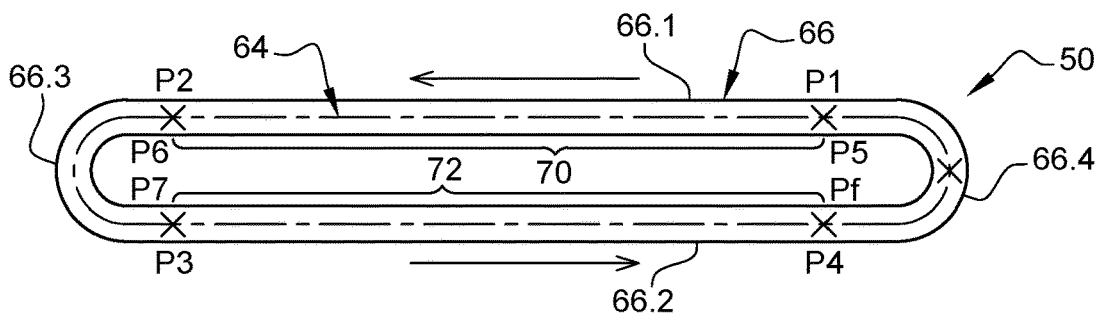
FIG. 11A is a plan view of a transparent weld which illustrates another embodiment of the invention.

According to an aspect of the invention, the energy input beam 62 describes a trajectory 64 in the form of a closed loop, without ends, as illustrated in FIGS. 9A, 10A and 11A, so as to obtain a weld bead 66 in the form of a closed loop.

The provision of an endless weld bead 66 makes it possible to obtain a weld bead that is regular over all its length. Otherwise the start and the end of the weld bead are not regular so it is necessary to overdimension the first and second panels 54, 56 so that, after the welding step, the first and second panels 54, 56 are machined so as to eliminate the ends of the weld bead and to retain only the parts of the first and second panels 54, 56 having a regular weld bead. Thus, the provision of a weld bead in the form of a closed loop makes it possible to avoid the machining step subsequent to the welding step, which tends to reduce the material quantities and the costs.

According to one configuration, each weld 50 comprises a weld bead 66 which has two rectilinear sections 66.1, 66.2, approximately parallel and with little spacing between them, and two curved sections 66.3, 66.4, in the form of a semicircle, linking the rectilinear sections 66.1, 66.2 so as to obtain an oblong closed loop.

With little spacing between them it is understood to mean that the distance separating the two rectilinear sections 66.1, 66.2 is of the same order of magnitude as the width of the weld bead 66. Thus, the distance separating the two rectilinear sections 66.1, 66.2 lies between 1 and 5 times the width of the weld bead 66.

As an indication, the weld bead 66 has a width lying between 1 and 7 mm, preferably between 2 and 3 nm.

According to a feature of the invention, the trajectory 64 of the energy input beam 62 and/or at least one of the parameters of the energy input beam 62 out of the power, the intensity, the rate of advance, the focus, the vibration of the energy input beam, are configured so that the weld bead 66 has geometrical and/or mechanical characteristics that are substantially constant over all its length.

Figure 9B:
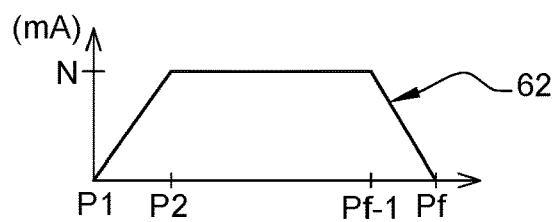
FIG. 9B is a curve of the intensity of an energy input beam at different points of the transparent weld that can be seen in FIG. 9A.

According to a first embodiment illustrated by FIGS. 9A, 9B, the trajectory 64 of the energy input beam 62 begins at a point of departure for P1 and stops at a final point Pf, the final point Pf being offset relative to the point of departure P1 so that the energy input beam 62 travels an overlap portion 68 of the weld bead 66 twice. The overlap portion 68 has a length L68 such that the weld bead 66 has geometrical and/or mechanical characteristics that are substantially constant over all its length. If the energy input beam 62 generates a weld bead 66 with defects over a starting portion 70 which extends from the point of departure P1, over a length L70, and over a stopping portion 72 which extends to the final point Pf, over a length L72, the distance L68 of the overlap portion 68 is greater than or equal to the sum of the lengths L70 and L72 of the starting and stopping portions 70 and 72, as illustrated in FIG. 9A.

According to a configuration that can be seen in FIG. 9B, the overlap portion 68 is only positioned on one of the rectilinear sections 66.1, 66.2 and does not extend over one of the curved sections 66.3, 66.4.

As illustrated in FIG. 9B, the energy input beam 62 has an intensity or a power:
which increases from a zero value at the point of departure P1 to a nominal value N at the end of the starting portion 70 represented by the point P2,
which is constant and equal to the nominal value N from the point P2 to the point Pf-1 representing the start of the stopping portion 72, and
which decreases from the nominal value N to the zero value over the stopping portion 72 beginning at the point Pf-1 and finishing at the point Pf.

Figure 10B:
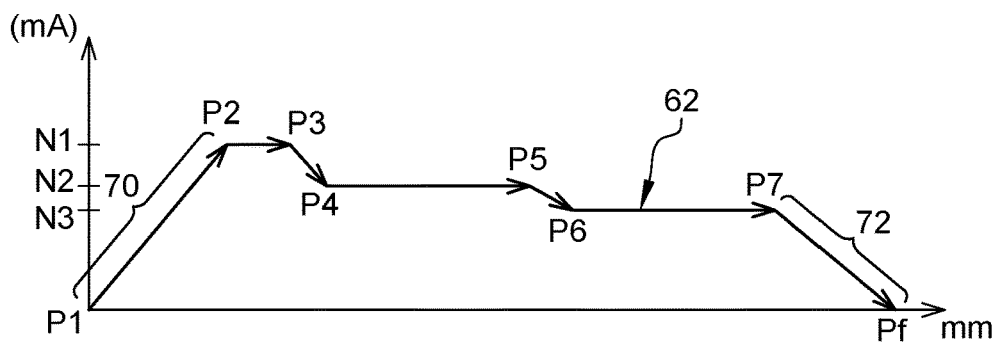
FIG. 10B is a curve of the intensity of an energy input beam at different points of the transparent weld that can be seen in FIG. 10A.
Figure 11B:
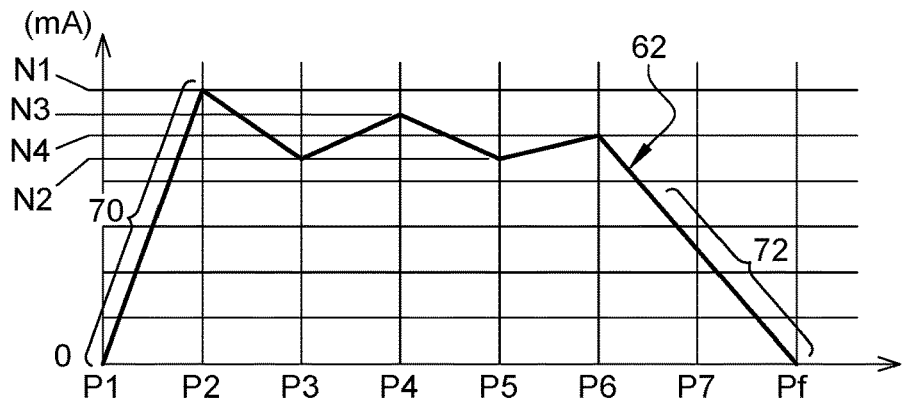
FIG. 11B is a curve of the intensity of an energy input beam at different points of the transparent weld that can be seen in FIG. 11A.

According to another feature that can be seen in FIGS. 10B and 11B, the energy input beam 62 has an intensity or a power which decreases from the start to the end of each curved section 66.3, 66.4 of the trajectory 64.

According to a configuration that can be seen in FIGS. 10A and 11A, the starting portion 70 going from the point of departure P1 to the point P2 extends only over one of the rectilinear sections 66.1, 66.2 of the weld bead 66.

The starting 70 and stopping 72 portions do not overlap. According to an embodiment that can be seen in FIG. 10B, the stopping portion 72 extends over one of the curved sections 66.3 and over the adjacent rectilinear section 66.2. According to another embodiment that can be seen in FIG. 11B, the stopping portion 72 extends over a rectilinear section 66.2 different from the rectilinear section 66.1 on which the starting portion 70 is positioned.

So as to obtain a gradual and slow increase in the intensity or the power of the energy input beam 62, each of the starting and stopping portions 70, 72 extends over almost all the length of the rectilinear sections 66.1, 66.2, as illustrated in FIG. 11B.

According to an embodiment that can be seen in FIG. 10B, the energy input beam 62 has an intensity or a power which is substantially constant over each of the rectilinear sections 66.1, 66.2, except for the starting and stopping portions 70, 72.

According to the embodiment that can be seen in FIG. 10B, the energy input beam 62 has an intensity or a power:
which increases from a zero value at the point of departure P1 to a first value N1 at the end of the starting portion 70 represented by the point P2, the points P1 and P2 being situated on a first rectilinear section 66.1,
which is constant and equal to the first value N1 from the point P2 to a point P3 corresponding approximately to the end of the first rectilinear section 66.1 and to the start of the first curved section 66.3,
which decreases from the first value N1 to a second value N2 from the point P3 to a point P4 corresponding approximately to the end of the first curved section 66.3 and to the start of the second rectilinear section 66.2,
which is constant and equal to the second value N2 from the point P4 to a point P5 corresponding approximately to the end of the second rectilinear section 66.2 and to the start of the second curved section 66.4,
which decreases from the second value N2 to a third value N3 from the point P5 to a point P6 corresponding approximately to the end of the second curved section 66.4 and to the start of the first rectilinear section 66.1,
which is constant and equal to the third value N3 from the point P6 to a point P7 situated on the first rectilinear section 66.1, offset towards the centre of the first rectilinear section 66.1 relative to the point P3,
which decreases from the third value N3 to a zero value over the stopping portion 72 beginning at the point P7 and finishing at the point Pf positioned approximately at the centre of the second rectilinear portion 66.2.

According to an embodiment that can be seen in FIG. 11B, the energy input beam 62 has an intensity or a power which increases from the start to the end of each rectilinear section 66.1, 66.2, except for the stopping portion 72.

According to the embodiment that can be seen in FIG. 11B, the energy input beam 62 has an intensity or a power:
- which increases, over almost all the length of the first rectilinear section 66.1, from a zero value at the point of departure P1 to a first value N1 at the end of the starting portion 70 represented by the point P2, the point P2 corresponding approximately to the end of the first rectilinear section 66.1 and to the start of the first curved section 66.3,
- which decreases, over the first curved section 66.3, from the first value N1 to a second value N2, from the point P2 to a point P3 corresponding approximately to the end of the first curved section 66.3 and to the start of the second rectilinear section 66.2,
- which increases, over the second rectilinear section 66.2, from the value N2 to a third value N3, lower than the first value N1, from the point P3 to a point P4 corresponding approximately to the end of the second rectilinear section 66.2 and to the start of the second curved section 66.4,
- which decreases, over the second curved section 66.4, from the third value N3 to approximately the second value N2 from the point P4 to a point P5 corresponding approximately to the point P1 positioned at the end of the second curved section 66.4 and to the start of the first rectilinear section 66.1,
- which increases, over the first rectilinear section 66.1, from the value N2 to a fourth value N4, lower than the third value N3, from the point P5 to a point P6 corresponding approximately to the point P2,
- which decreases from the fourth value N4 to a zero value, from the point P6 to the final point Pf corresponding approximately to the point P4 passing through the point P7 corresponding approximately to the point P3.

Whatever the embodiment, the trajectory 64 comprises at least one overlap portion 68, travelled at least twice by the energy input beam 62, the overlap portion 68 having a length greater than or equal to the sum of the lengths of the starting and stopping portions 70, 72 of the energy input beam 62.

Whatever the embodiment illustrated by FIGS. 10A, 10B, 11A and 11B, the energy input beam 62 has, in each rectilinear section 66.1, 66.3, an intensity or a power having a maximum value. These maximum values in the different rectilinear sections 66.1, 66.2 (N1, N2, N3 for the embodiment that can be seen in FIGS. 10A and 10B, and N1, N3, N4 for the embodiment that can be seen in FIGS. 11A and 11B) decrease from one rectilinear section to the other along the trajectory 64 of the energy input beam 62. Thus, the power or the intensity of the energy input beam 62 is adapted so as to take account of the heat input already provided to the panels 54, 56 in the overlapping zones of the trajectory 64.

Obviously, the welding assembly method according to the invention is not limited to the assembly of the panels of a primary structure of an aircraft pylon. It can be applied to the assembly of at least two parts, the weld being produced in a zone of overlay of the parts to be assembled.

When it is applied to the assembly of the panels of a primary structure 40 of an aircraft pylon, at least one weld 50, a single weld 50 according to an embodiment that can be seen in FIG. 5, is produced in accordance with the invention to link each top or bottom panel 42, 44 to each right or left side panel 46, 48. This mode of assembly makes it possible to reduce the weight of the primary structure by eliminating the flanges or the angle irons ensuring the joining of the panels to one another.

The invention claimed is:

1. A method for assembling at least two parts comprising:
using an energy input beam for transparent welding, the energy input beam travelling a trajectory so as to generate a weld bead, disposed straddling the two parts and linking them,
wherein the trajectory follows a closed loop, the trajectory of the energy input beam and/or at least one parameter of the energy input beam configured so that the weld bead has mechanical and/or geometrical characteristics that are substantially constant over all a length of the trajectory, and
wherein the trajectory comprises at least one overlap portion, travelled at least twice by the energy input beam, the overlap portion having a length greater than or equal to the sum of the lengths of the starting and stopping portions of the energy input beam.

2. An assembly method according to claim 1, wherein the trajectory follows an oblong closed loop, the weld bead having two rectilinear sections that are approximately parallel with little spacing between them, as well as two curved sections linking the rectilinear sections.

3. The assembly method according to claim 2, wherein, each curved section has a start and an end, the energy input beam has an intensity or a power which decreases from the start to the end of each curved section of the trajectory.

4. The assembly method according to claim 2, wherein the energy input beam has, in each rectilinear section, an intensity or a power having a maximum value, the maximum values in the different rectilinear sections decreasing from one rectilinear section to the other along the trajectory of the energy input beam.

5. The assembly method according to claim 2, wherein, each rectilinear section has a start and an end, the energy input beam has an intensity or a power which increases from the start to the end of each rectilinear section, except for the stopping portion of the energy input beam.

6. The assembly method according to claim 2, wherein the energy input beam has an intensity or a power which is substantially constant over each of the rectilinear sections, except for the starting and stopping portions of the energy input beam.

7. The assembly method according to claim 1, wherein the energy input beam is an electron beam.

8. A method for assembling a primary structure of an aircraft pylon comprising a top panel, a bottom panel, a right side panel and a left side panel, wherein at least one top or bottom panel is linked to at least one right or left side panel by using the assembly method according to claim 1.

9. The method for assembling a primary structure of an aircraft pylon according to claim 8, wherein each top and bottom panel is linked to each right and left side panel.

10. A primary structure of an aircraft pylon obtained from the assembly method according to claim 8.

11. An aircraft comprising at least one primary structure of an aircraft pylon according to claim 10.

* * * * *